(12) United States Patent
Stenson et al.

(10) Patent No.: US 8,367,171 B2
(45) Date of Patent: Feb. 5, 2013

(54) POLYMER HAVING POLYCYCLIC GROUPS AND COATING COMPOSITIONS THEREOF

(75) Inventors: Paul Stenson, Gattikon (CH); Benoit Prouvost, L'Abergement de Cuisery (FR); Jeffrey Niederst, Leechburg, PA (US); Donald G. Wind, Gibsonia, PA (US); Richard H. Evans, Wexford, PA (US); Charles Skillman, Zelienople, PA (US); Paul E. Share, Wexford, PA (US); James Robinson, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 13/152,055

(22) Filed: Jun. 2, 2011

(65) Prior Publication Data

US 2011/0290696 A1    Dec. 1, 2011

Related U.S. Application Data

(63) Continuation-in-part of application No. 12/786,089, filed on May 24, 2010, which is a continuation-in-part of application No. PCT/US2010/030584, filed on Apr. 9, 2010, said application No. 12/786,089 is a continuation-in-part of application No. PCT/US2009/065848, filed on Nov. 25, 2009.

(Continued)

(51) Int. Cl.
| | |
|---|---|
| B29D 22/00 | (2006.01) |
| B29D 23/00 | (2006.01) |
| B32B 1/08 | (2006.01) |
| B32B 15/08 | (2006.01) |

(52) U.S. Cl. ............... 428/35.8; 428/35.3; 428/34.3; 428/35.7; 428/36.9; 428/36.91; 428/457; 428/458; 428/461; 428/462; 428/480; 428/423.1; 428/425.8; 427/239; 427/327; 523/100

(58) Field of Classification Search .............. 428/35.3, 428/34.3, 35.7, 35.8, 36.9, 36.91, 457, 458, 428/461, 462, 480, 423.1, 425.8; 423/214; 427/239, 327; 523/100

See application file for complete search history.

(56) References Cited

U.S. PATENT DOCUMENTS

| | | | |
|---|---|---|---|
| 3,166,434 A | 1/1965 | Gauger, Jr. | |
| 3,306,868 A | 2/1967 | Adrian, Jr. | |
| 3,333,022 A | 7/1967 | Reiners et al. | |
| 3,340,327 A | 9/1967 | Spellberg et al. | |
| 3,343,806 A | 9/1967 | Bobo et al. | |
| 3,448,066 A | 6/1969 | Parker | |
| 3,477,996 A | 11/1969 | Formaini | |
| 3,674,727 A | 7/1972 | Fekete et al. | |
| 3,867,480 A | 2/1975 | Fujiyoshi et al. | |
| 3,919,063 A | 11/1975 | Maruyama et al. | |
| 3,933,757 A | 1/1976 | Pratt et al. | |
| 3,965,059 A | 6/1976 | Kerridge et al. | |
| 3,986,992 A | 10/1976 | Canning et al. | |
| 3,988,288 A | 10/1976 | Yamauchi et al. | |
| 4,010,130 A | 3/1977 | Matsuo et al. | |
| 4,073,827 A | 2/1978 | Okasaka et al. | |
| 4,167,542 A | 9/1979 | Nelson | |
| 4,206,291 A | 6/1980 | Takahashi et al. | |
| 4,340,519 A | 7/1982 | Kotera et al. | |
| 4,360,647 A | 11/1982 | Hefner, Jr. | |
| 4,443,580 A | 4/1984 | Hefner, Jr. | |
| 4,452,954 A | 6/1984 | Schade et al. | |
| 4,522,977 A | 6/1985 | Gardner | |
| 4,631,320 A | 12/1986 | Parekh et al. | |
| 4,777,196 A | 10/1988 | Hefner, Jr. | |
| 5,198,471 A | 3/1993 | Nauman et al. | |
| 5,242,994 A | 9/1993 | Nield et al. | |
| 5,252,682 A | 10/1993 | Bayha | |
| 5,278,282 A | 1/1994 | Nauman et al. | |
| 5,288,805 A | 2/1994 | Kodali | |
| 5,290,828 A | 3/1994 | Craun et al. | |
| 5,314,751 A | 5/1994 | Nield et al. | |
| 5,693,715 A | 12/1997 | Kodali | |
| 5,739,215 A | 4/1998 | Westerhof et al. | |
| 5,916,979 A | 6/1999 | Koegler et al. | |
| 6,048,949 A | 4/2000 | Muthiah et al. | |
| 6,069,187 A | 5/2000 | Kusumoto et al. | |
| 6,306,934 B1 | 10/2001 | Bode et al. | |
| 6,413,648 B1 | 7/2002 | Heyenk et al. | |
| 6,472,480 B1 | 10/2002 | Anderson | |
| 6,512,025 B2 | 1/2003 | Choudhery | |
| 6,710,151 B2 | 3/2004 | Kuwatsuka et al. | |
| 6,818,151 B2 | 11/2004 | Yang et al. | |
| 6,893,678 B2 | 5/2005 | Hirose et al. | |
| 6,930,161 B2 * | 8/2005 | Schwarte et al. | ............... 528/45 |
| 6,974,631 B2 | 12/2005 | Hayes et al. | |
| 7,198,849 B2 | 4/2007 | Stapperfenne et al. | |

(Continued)

FOREIGN PATENT DOCUMENTS

| | | |
|---|---|---|
| AU | 654600 B2 | 6/1993 |
| DE | 2245110 | 9/1972 |

(Continued)

OTHER PUBLICATIONS

U.S. Appl. No. 13/267,928, filed Oct. 7, 2011 Skillman, et al.

(Continued)

*Primary Examiner* — Michael C Miggins

(57) ABSTRACT

A polymer and coating composition containing the polymer are provided that are useful in coating applications such as, for example, food or beverage packaging containers. The polymer preferably includes a backbone having one or more polycyclic groups. In one embodiment, the polymer is a polyester and, more preferably, a polyester-urethane polymer. In one embodiment, the one or more polycyclic groups is a tricyclic or higher group.

20 Claims, No Drawings

Related U.S. Application Data

(60) Provisional application No. 61/118,224, filed on Nov. 26, 2008, provisional application No. 61/168,138, filed on Apr. 9, 2009.

(56) References Cited

U.S. PATENT DOCUMENTS

| | | |
|---|---|---|
| 7,244,506 B2 | 7/2007 | Hayes et al. |
| 7,247,390 B1 | 7/2007 | Yang et al. |
| 7,326,752 B2 | 2/2008 | McAlvin et al. |
| 7,517,559 B2 * | 4/2009 | Thiebes et al. ............. 427/388.1 |
| 7,763,323 B2 | 7/2010 | Mayr et al. |
| 2003/0064185 A1 | 4/2003 | Mazza et al. |
| 2004/0044117 A1 | 3/2004 | Kiefer-Liptak et al. |
| 2005/0038162 A1 | 2/2005 | Kuhlmann et al. |
| 2005/0129847 A1 | 6/2005 | Thiebes et al. |
| 2005/0196629 A1 | 9/2005 | Bariatinsky et al. |
| 2006/0093768 A1 | 5/2006 | Parekh et al. |
| 2006/0149019 A1 | 7/2006 | Wamprecht et al. |
| 2007/0054140 A1 | 3/2007 | Mayr et al. |
| 2007/0281179 A1 | 12/2007 | Ambrose et al. |
| 2008/0015302 A1 | 1/2008 | Kiefer-Liptak et al. |
| 2008/0262613 A1 | 10/2008 | Gogolewski |
| 2010/0051862 A1 | 3/2010 | Share et al. |
| 2010/0056726 A1 | 3/2010 | Payot et al. |
| 2010/0260954 A1 | 10/2010 | Stenson et al. |
| 2012/0027974 A1 | 2/2012 | Skillman et al. |
| 2012/0058354 A1 | 3/2012 | Hayes et al. |
| 2012/0125799 A1 | 5/2012 | Doreau et al. |

FOREIGN PATENT DOCUMENTS

| | | |
|---|---|---|
| EP | 0548727 A2 | 12/1992 |
| EP | 0583777 A1 | 8/1993 |
| EP | 0780455 A2 | 12/1996 |
| EP | 1474490 B1 | 2/2003 |
| EP | 1627898 A1 | 5/2004 |
| GB | 1280404 | 7/1972 |
| WO | 9407932 A1 | 4/1994 |
| WO | 9519379 A1 | 7/1995 |
| WO | 9726304 A1 | 7/1997 |
| WO | 2004013240 A1 | 2/2004 |
| WO | 2008036629 A2 | 3/2008 |
| WO | 2009117330 A1 | 9/2009 |
| WO | 2010055019 A1 | 5/2010 |
| WO | 2010118356 A1 | 10/2010 |

OTHER PUBLICATIONS

U.S. Appl. No. 13/114,447, filed May 24, 2011 Doreau, et al.
U.S. Appl. No. 13/267,288, filed Oct. 6, 2011 Hayes, et al.
U.S. Appl. No. 12/786,089, filed May 24, 2010 Stenson, et al.
International Search Report and Written Opinion for corresponding International Application No. PCT/US2010/035955 mailed on Jan. 31, 2011 (11 pages).
International Search Report and Written Opinion for International Application No. PCT/US2009/065848 mailed on May 7, 2010 (12 pages).
International Search Report and Written Opinion for International Application No. PCT/US2010/030576 mailed on Jul. 2, 2010 (9 pages).
International Search Report and Written Opinion for International Application No. PCT/US2010/030584 mailed on Jul. 12, 2010 (12 pages).
Evonik Degussa Dynapol® I 912 Polyester Resin Product Information, obtained from www.matweb.com (1 page).
Matasa, Claude G., The Orthodontic Materials Insider, Dec. 2004, vol. 16, No. 4, Orth-Cycle Co., Hollywood, FL, USA (8 pages).
New Food Contact Approval, Smart Formulating Journal, Apr. 2010, Issue 7, p. 6, Evonik Degussa GmbH, Essen Germany (6 pages).
Smith, P.L., et al., The Use of Dicyclopentadiene in Polyesters, The Society of the Plastics Industry, Inc., 22nd Annual Meeting of the Reinforced Plastics Division in Washington, D.C., USA, Jan. 31, Feb. 1-3, 1967 (13 pages).

* cited by examiner

POLYMER HAVING POLYCYCLIC GROUPS AND COATING COMPOSITIONS THEREOF

CROSS-REFERENCE TO RELATED APPLICATION(S)

The present application is a continuation-in-part of U.S. application Ser. No. 12/786,089 filed May 24, 2010 and entitled "POLYMER HAVING POLYCYCLIC GROUPS AND COATING COMPOSITIONS THEREOF," which is a continuation-in-part of International Application Serial No. PCT/US2010/030584 filed Apr. 9, 2010 and entitled "POLYMER HAVING UNSATURATED CYCLOALIPHATIC FUNCTIONALITY AND COATING COMPOSITIONS FORMED THEREFROM," which claims priority to U.S. Provisional Patent Application Ser. No. 61/168,138 filed on Apr. 9, 2009 and entitled "POLYESTER POLYMER HAVING UNSATURATED CYCLOALIPHATIC FUNCTIONALITY AND COATING COMPOSITIONS FORMED THEREFROM." The aforementioned U.S. application Ser. No. 12/786,089 is also a continuation-in-part of International Application Serial No. PCT/US2009/065848 filed Nov. 25, 2009 and entitled "POLYESTER POLYMER AND COATING COMPOSITIONS THEREOF," which claims priority to U.S. Provisional Application No. 61/118,224 filed Nov. 26, 2008 and entitled "POLYESTER POLYMER AND COATING COMPOSITIONS THEREOF." Each of the aforementioned patent applications is incorporated herein by reference in its entirety.

TECHNICAL FIELD

This invention relates to a polymer and coating compositions formulated from the polymer.

BACKGROUND

The application of coatings to metals to retard or inhibit corrosion is well established. This is particularly true in the area of packaging containers such as metal food and beverage cans. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food and beverage containers to prevent corrosion in the headspace of the container between the fill line of the food product and the container lid.

Packaging coatings should preferably be capable of high-speed application to the substrate and provide the necessary properties when hardened to perform in this demanding end use. For example, the coating should be safe for food contact, not adversely affect the taste of the packaged food or beverage product, have excellent adhesion to the substrate, resist staining and other coating defects such as "popping," "blushing" and/or "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging.

Various coatings have been used as interior protective can coatings, including epoxy-based coatings and polyvinyl-chloride-based coatings. Each of these coating types, however, has potential shortcomings. For example, the recycling of materials containing polyvinyl chloride or related halide-containing vinyl polymers can be problematic. There is also a desire by some to reduce or eliminate certain epoxy compounds commonly used to formulate food-contact epoxy coatings.

To address the aforementioned shortcomings, the packaging coatings industry has sought coatings based on alternative binder systems such as polyester resin systems. It has been problematic, however, to formulate polyester-based coatings that exhibit the required balance of coating characteristics (e.g., flexibility, adhesion, corrosion resistance, stability, resistance to crazing, etc.). For example, there has typically been a tradeoff between corrosion resistance and fabrication properties for such coatings. Polyester-based coatings suitable for food contact that have exhibited both good fabrication properties and an absence of crazing have tended to be too soft and exhibit unsuitable corrosion resistance. Conversely, polyester-based coatings suitable for food contact that have exhibited good corrosion resistance have typically exhibited poor flexibility and unsuitable crazing when fabricated.

What is needed in the marketplace is an improved binder system for use in coatings such as, for example, packaging coatings.

SUMMARY

The present invention provides a polymer having one or more organic polycyclic groups. The polycyclic groups may be saturated, unsaturated, aromatic, or a combination thereof, and may include one or more heteroatoms (e.g., oxygen, nitrogen, silicon, phosphorus, sulfur, etc.) in a ring thereof. The polymer may include any suitable combination of polycyclic groups selected from bicyclic groups, at least tricyclic groups, or polycyclic groups having four or more rings. In one embodiment, the one or more polycyclic groups are selected from saturated, unsaturated, or aromatic bicyclic groups; saturated, unsaturated, and/or aromatic at least tricyclic polycyclic groups; or a combination thereof. Substituted or unsubstituted tricyclodecane, nobornene, and isosorbide groups are examples of preferred polycyclic groups. In preferred embodiments, the polymer includes a backbone having one or more heteroatoms, more preferably a backbone including ester and/or urethane linkages. Step-growth polymers such as, for example, polyester polymers, polyurethane polymers, and polyester-urethane polymers are presently preferred.

In one embodiment, the invention provides a polymer (more preferably a polyester polymer, polyurethane polymer, or polyester-urethane polymer) that includes both unsaturated bicyclic groups and at least tricyclic groups. A preferred example of such a polymer is a polyester-urethane polymer that includes a plurality of unsaturated bicyclic groups (more preferably substituted or unsubstituted norbornene groups) and a plurality of tricyclic groups (more preferably substituted or unsubstituted tricyclodecane groups).

In one embodiment, the invention provides a method for making a polyurethane polymer, more preferably a polyester-urethane polymer, that includes reacting ingredients including a polyol (more preferably a polyester polyol) and a polyisocyanate to form a polyurethane polymer having one or more polycyclic groups. Preferably at least one of the polyol or polyisocyanate includes a polycyclic group.

In one embodiment, the invention provides a coating composition that includes a polymer, more preferably a polyester and/or polyurethane polymer, having one or more polycyclic groups. The coating composition may optionally include additional ingredients such as a liquid carrier, a crosslinker, and any additional desired additives. In presently preferred embodiments, the coating composition is a water-based or a solvent-based coating composition.

In one embodiment, the invention provides articles having a coating composition of the invention applied on at least a portion of a surface thereof. The coating composition of the invention may have utility in a wide range of coating applications including, for example, as a packaging coating, and especially as a packaging coating for use on food or beverage containers (e.g., metal food or beverage cans), or a portion thereof.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and from the claims.

Selected Definitions

Unless otherwise specified, the following terms as used herein have the meanings provided below.

As used herein, the term "organic group" means a substituted or unsubstituted hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups).

Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The term "cyclic group" means a closed ring organic group that is classified as an alicyclic group or an aromatic group, both of which can include heteroatoms.

The term "alicyclic group" means a cyclic organic group having properties resembling those of aliphatic groups.

The term "polycyclic" when used in the context of a group refers to an organic group that includes at least two cyclic groups in which one or more atoms (and more typically two or more atoms) are present in the rings of both of the at least two cyclic groups. Thus, for example, a group that consists of two cyclohexane groups connected by a single methlylene group is not a polycyclic group.

The term "tricyclic" group refers to a polycyclic group that includes three cyclic groups in which the ring of each cyclic group shares one or more atoms with one or both of the rings of the other cyclic groups.

A group that may be the same or different is referred to as being "independently" something.

The terms "unsaturation" or "unsaturated" when used in the context of a compound or group refers to a compound or group that includes at least one non-aromatic (i.e., aliphatic) carbon-carbon double or triple bond.

The term "aliphatic" when used in the context of a carbon-carbon double bond includes both linear aliphatic carbon-carbon double bonds and cycloaliphatic carbon-carbon double bonds, but excludes carbon-carbon double bonds of aromatic rings.

The term "substantially free" of a particular mobile compound means that the recited polymer and/or composition contains less than 100 parts per million (ppm) of the recited mobile compound. The term "essentially free" of a particular mobile compound means that the recited polymer and/or composition contains less than 5 ppm of the recited mobile compound. The term "completely free" of a particular mobile compound means that the recited polymer and/or composition contains less than 20 parts per billion (ppb) of the recited mobile compound.

The term "mobile" means that the compound can be extracted from the cured coating when a coating (typically ~1 mg/square centimeter (6.5 mg/square inch) thick) is exposed to a test medium for some defined set of conditions, depending on the end use. An example of these testing conditions is exposure of the cured coating to HPLC-grade acetonitrile for 24 hours at 25° C. If the aforementioned phrases are used without the term "mobile" (e.g., "substantially free of BPA") then the recited polymer and/or composition contains less than the aforementioned amount of the compound whether the compound is mobile in the coating or bound to a constituent of the coating.

The term "food-contact surface" refers to the substrate surface of a container that is in contact with, or intended for contact with, a food or beverage product.

The term "crosslinker" refers to a molecule capable of forming a covalent linkage between polymers or between two different regions of the same polymer.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers or repeat units). Similarly, unless otherwise indicated, the use of a term designating a polymer class such as, for example, "polyester" is intended to include both homopolymers and copolymers (e.g., polyester-urethane polymers).

The terms "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "a" polyester can be interpreted to mean that the coating composition includes "one or more" polyesters.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In one aspect, the invention provides a polymer having one or more polycyclic groups. The polymer preferably includes a polymer backbone having one or more heteroatoms (e.g., oxygen, nitrogen, silicon, sulfur, phosphorus, etc.) and, more preferably, is a step-growth polymer. Preferred step-growth polymers include polyester polymers, polyurethane polymers, and copolymers thereof. In certain preferred embodiments, the polymer has a backbone that includes both ester and urethane linkages.

The polymer preferably includes at least one polycyclic group, and more preferably a plurality of polycyclic groups (e.g., $\geq 2$, $\geq 3$, $\geq 4$, $\geq 5$, $\geq 10$, etc.). The polycyclic group(s) may be present in a backbone of the polymer, a pendant group of the polymer, or a combination thereof. In preferred embodiments, the polymer includes at least one, and more preferably a plurality, of backbone polycyclic groups. While not intending to be bound by theory, it is believed that the presence of polycyclic groups can result in a binder polymer having properties that approach that of conventional BPA-based epoxy resins. It is believed that the inclusion of polycyclic groups contributes to the polymer of the invention having a desirable combination of coating properties such as, for example, excellent hardness, rigidity, and thermal stability.

One useful measure for assessing the number of polycyclic groups in the polymer is the weight percent (wt-%) of the polycyclic groups relative to the total weight of the polymer. In certain preferred embodiments, polycyclic groups constitute at least about 10, more preferably at least about 20, even more preferably at least about 30 wt-% of the polymer. While the upper end is not especially limited, in some embodiments, the polycyclic groups constitute less than about 80, less than about 60, or less than about 40 wt-% of the polymer.

Caution should be exercised when interpreting the wt-% of polycyclic groups because direct measurement of the weight of the polycyclic groups may not be feasible. Accordingly, the aforementioned wt-%'s correspond to the total weight of (a) polycyclic-containing monomers relative to (b) the total weight of the polymer. Thus, for example, if an oligomer having a polycyclic group is incorporated into the backbone of the polymer, the wt-% of polycyclic groups in the polymer is calculated using the weight of the monomer that includes the polycyclic group(s) (as opposed to the weight of the oligomer that includes the monomer). Similarly, if the polymer is formed and then a monomer of the preformed polymer is modified to include a polycyclic group, then the wt-% of polycyclic groups in the polymer is calculated using the weight of the modified monomer, which may be based on a theoretical calculation if necessary. For example, in some embodiments, bicyclic groups are incorporated into the polymer of the invention via a Diels-Alder reaction of cyclopentadiene across the double bond of an unsaturated monomer (e.g., maleic anhydride) present in the backbone of the polymer. In this situation, the wt-% of polycyclic groups in the polymer is determined using the weight of the resulting bicyclic-modified monomer present in the polymer.

The polycyclic groups can be of any suitable structure. The polycyclic groups can include one or more heteroatoms (e.g., nitrogen, oxygen, silicon, sulfur, phosphorus, etc.) in a ring of the polycyclic group. Moreover, the polycyclic groups can include one or more double or triple bonds (including, e.g., carbon-carbon double or triple bonds) or combinations thereof. The double or triple bonds may be included between atoms of a ring of the polycyclic group, in a substituent group of a ring of the polycyclic group, or a combination thereof. In certain preferred embodiments, the polycyclic group is an unsaturated group that includes one or more carbon-carbon double bonds and, more preferably, one or more carbon-carbon double bonds located between carbon atoms of one or more rings thereof. In other preferred embodiments, some or all of the rings of the polycyclic group are saturated. Although not presently preferred, it is also contemplated that one or more, and in some embodiments all, of the cyclic groups of the polycyclic group may be aromatic.

The polycyclic groups can include any suitable number of ring groups. Examples of suitable polycyclic groups include bicyclic groups, tricyclic groups, and polycyclic groups including four or more ring groups. Such polycyclic groups may be present in the polymer of the present invention in any suitable combination. The polycyclic groups may be spiro ring systems (i.e., where two rings join at a single common atom), fused ring systems (i.e., where two rings share two or more common atoms), bridged ring systems (i.e., where two rings share three or more common atoms), or a combination thereof. Fused and/or bridged polycyclic groups are presently preferred.

The polycyclic groups can include any combination of suitably sized ring groups. For example, the polycyclic groups may include any combination of organic cyclic groups having 3-atom rings, 4-atom rings, 5-atom rings, 6-atom rings, 7-atom rings, or 8-atom or higher rings. Typically, carbon atoms constitute a majority of the atoms making up the rings or all of the atoms making up the rings. In certain preferred embodiments, the polycyclic groups include two or more 5-atom rings, two or more 6-atom rings, or at least one 5-atom ring and at least one 6-atom ring.

In some embodiments, the polymer of the invention includes two or more different types of polycyclic groups (e.g., one or more bicyclic group(s) and one or more at least tricyclic group(s)). A preferred combination is one or more unsaturated bicyclic groups (more preferably one or more substituted or unsubstituted norbornene groups) and one or more at least tricyclic groups (more preferably one or more substituted or unsubstituted tricyclodecane groups). In other embodiments, all of the polycyclic groups included in the polymer are a same or similar type of polycyclic group.

Some non-limiting examples of suitable polycyclic groups are provided below. It is contemplated that any of the polycyclic groups disclosed herein may be suitably included in the polymer of the present invention in any combination.

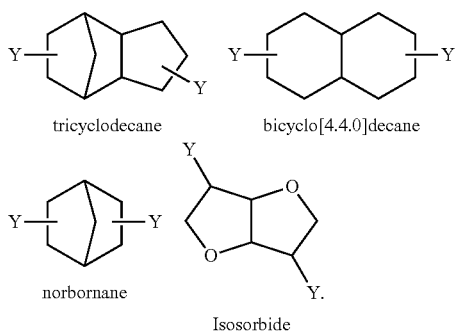

The above polycyclic groups are each represented as a divalent unit of the polymer (e.g., a divalent backbone unit) where each "Y" independently denotes another portion of the polymer that can be attached to any suitable atom of the polycyclic group (with the exception of the depicted isosorbide group) and where one Y may be an end group. It is also contemplated that variants of any of the above depicted polycyclic structures may be used such as, for example, substituted variants thereof or unsaturated variants thereof. An example of an unsaturated variant of a norbornane group is a norbornene group, which is preferred in certain embodiments. Additional examples of suitable polycyclic groups for use in the polymer of the present invention are provided in PCT Application No. PCT/US2010/0030584 filed on Apr. 9, 2010 and entitled "Polymer Having Unsaturated Cycloaliphatic Functionality and Coating Compositions Formed Therefrom" and PCT Application No. PCT/US2010/0030576 filed on Apr. 9, 2010 and entitled "Polyester Coating Composition."

The one or more polycyclic groups can be incorporated into the polymer of the invention using any suitable method. Typically, polycyclic groups are incorporated into the polymer using a reactant (e.g., a monomer, oligomer, or polymer reactant) having both: (i) one or more polycyclic groups and (ii) one or more active hydrogen groups such as, for example, carboxylic acid or anhydride groups or hydroxyl groups. Other suitable active hydrogen groups may include groups having a hydrogen attached to an oxygen (O), sulfur (S), and/or nitrogen (N) atom, as in the groups —SH, =NH, and NH$_2$. Isocyanate (—NCO) functionality may also be used. Presently preferred polycyclic-group-containing reactants have two or more (more preferably two) active hydrogen or isocyanate groups. Carboxylic acid groups, anhydride groups, isocyanate groups, hydroxyl groups, and combinations thereof, are presently preferred. Examples of some suitable polycyclic-containing reactants include polycyclic-containing polyols (e.g. tricyclodecane dimethanol (TCDM), isosorbide, isomannide, or isoidide); polycyclic-containing carboxylic acids and/or anhydrides (e.g., nadic acid or anhydride); polycyclic-containing polyamines (e.g., tricyclodecane diamine); and polycyclic-containing polyisocyanates (e.g., tricyclodecane diisocyanate). Difunctional polycyclic-containing reactants are preferred in certain embodiments.

It is also contemplated that a preformed polymer may be post-modified to include one or more polycyclic groups.

In some embodiments, one or more polycyclic groups are derived from plant-based materials such as, for, example corn. Examples of suitable plant-based materials include compounds derived from sugars, with anhydrosugars being preferred, and dianhydrosugars being especially preferred. Examples of suitable such compounds include bisanhydrodexitol or isohexide compounds such as, for example:

isosorbide (whose structure is depicted above), isomannide, isoidide, and derivatives or combinations thereof.

In some embodiments, the one or more polycyclic groups are unsaturated bicyclic groups represented by the IUPAC (International Union of Pure and Applied Chemistry) nomenclature of Expression (I) below:

bicyclo[x.y.z]alkene

In Expression (I):
x is an integer having a value of 2 or more,
y is an integer having a value of 1 or more,
z is an integer having a value of 0 or more, and
the term alkene refers to the IUPAC nomenclature designation (e.g., hexene, heptene, heptadiene, octene, etc.) for a given bicyclic molecule and denotes that that the bicyclic group includes one or more double bonds (more typically one or more carbon-carbon double bonds).

In some embodiments, z in Expression (I) is 1 or more. In other words, in certain embodiments the bicyclic groups are bridged bicyclic groups. By way of example, bicyclo[4.4.0]decane is not a bridged bicyclic.

In some embodiments, x has a value of 2 or 3 (more preferably 2) and each of y and z independently have a value of 1 or 2.

The bicyclic structures represented by Expression (I) include one or more carbon-carbon double bonds (e.g., 1, 2, 3, etc.).

Non-limiting examples of some suitable unsaturated bicyclic groups represented by Expression (I) include bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene. Bicyclo[2.2.1]heptene is a presently preferred unsaturated bicyclic group.

It is contemplated that the bicyclic groups represented by Expression (I) may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic group) or acyclic groups may be attached to the bicyclic group represented by Expression (I). Thus, for example, in some embodiments the bicyclic group of Expression (I) may be present in a tricyclic or higher group. While the unsaturated bicyclic groups may be present as a part of a tricyclic or higher group, presently preferred unsaturated bicyclic groups are not present in a tricyclic or higher group.

In some embodiments, some or all of the bicyclic groups may be saturated. Non-limiting examples of saturated bicyclics include saturated homologs of the structures represented by Expression (I) (i.e., bicyclo[x.y.z]alkane, with x, y, and z as previously described) such as, for example, bicyclo[2.1.1]hexane, bicyclo[2.2.1]heptane, bicyclo[2.2.2]octane, and bicyclo[3.2.1]octane, bicyclo[4.3.2]undecane, bicyclo[5.2.0]nonane. In one embodiment, the bicyclic group includes two saturated spiro, fused, and/or bridged rings and further includes one or more unsaturated and/or aromatic organic groups attached to one of the saturated rings.

In some embodiments, it may be advantageous for the polymer to include one or more backbone segments having the below structure (Formula I):

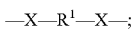

where:
each X is independently a polycyclic group;
R$^1$ is a divalent organic linking group (typically a substituted or unsubstituted hydrocarbon linking group that may include one or more heteroatoms in the chain); and
the two polycyclic groups are preferably closely spaced.

While not intending to be bound by any theory, it is believed that the inclusion of such backbone segments in a polymer may impart one or more beneficial coating properties for coatings incorporating the polymer. R$^1$ preferably has a chain length of 10 or less atoms (more preferably a chain length of $\leq 5$, $\leq 4$, $\leq 3$, $\leq 2$, or 1 atoms) in the backbone chain connecting the two X groups. In one embodiment, R$^1$ has the structure —C(R$^2$)$_2$— where each R$^2$ is independently a hydrogen, a halogen, or an organic group (e.g., a methyl group or a substituted or unsubstituted hydrocarbon group that can include one or more heteroatoms), and wherein the two R$^2$ groups can both be present in a ring group. A 2,2 isopropylidene group is an example of a —C(R$^2$)$_2$— group.

Segments having a structure of Formula I may be incorporated into a polymer of the invention using any suitable compound. For example, a di-functional dimer compound of the following Formula II may be used:

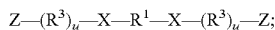

where:
X and R$^1$ are as described above for Formula I;
each u is independently 0 or 1;
each R$^3$, if present, is independently a divalent organic group (typically a substituted or unsubstituted C1-C10 hydrocarbon group that can include one or more heteroatoms); and
each Z is independently a reactive functional group, more preferably a functional group capable of reacting with a complimentary functional group to form a step-growth linkage such as, for example, an amide, carbonate, ether, ester, urea, or urethane linkage. Hydroxyl groups, carboxylic groups, and isocyanate groups are preferred functional groups.

An example of a representative compound of Formula II is provided below:

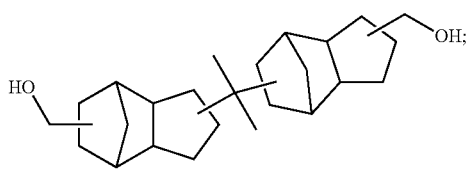

where: the linking group is a 2,2 isopropylidene group that can independently attach to any suitable carbon atom of the tricyclodecane groups and the hydroxyl groups can independently attach to any suitable carbon atom of the tricyclodecane groups. Such a compound may be formed, for example, through a dimerization reaction utilizing tricyclodecane dimethanol.

In certain preferred compounds, each of X and R$^1$ of Formulas I and II are independently selected such that the unit length of the —X—R$^1$—X— structure is similar to that of a backbone epoxy unit produced by 4,4'-isopropylidenediphenol (e.g., within 30%, 20%, 10%, etc. of the unit length of 4,4'-isopropylidenediphenol when present as a unit of a polyether polymer).

As discussed above, a combination of unsaturated bicyclic groups and at least tricyclic groups is preferred in certain embodiments. It has been discovered that the inclusion of a suitable amount of each of these groups in the same binder polymer, preferably in combination with urethane linkages, can result in an improved balance of properties such as excellent cure, excellent corrosion resistance, excellent blush resistance, and resistance to crazing. Comparable polyester polymers that were prepared which omitted one of the groups (i.e., urethane linkages, unsaturated bicyclic groups, or at least tricyclic groups) were observed to exhibit an inferior balance of coating properties relative to polyester polymers that included suitable amounts of all three groups.

In certain preferred embodiments, the polymer of the present invention is a polyester polymer, more preferably a polyester-urethane polymer, that includes at least 1 wt-% (more preferably 1 to 35 wt-%) of unsaturated bicyclic group containing monomer and at least 5 wt-% (more preferably 5 to 50 wt-%) of at least tricyclic group containing monomer, based on the total solid weight of ingredients incorporated into the polymer.

The polymer of the invention preferably has a glass transition temperature (Tg) of at least 30° C., more preferably at least 40° C., even more preferably at least 50° C., and in some embodiments 70° C. or more. In preferred embodiments, the Tg is less than 150° C., more preferably less than 130° C., even more preferably less than 110° C., and even more preferably less than 90° C. In one embodiment, the Tg is from about 70 to about 80° C. In embodiments where the polymer is to be used as a binder polymer for a food-contact coating composition, the Tg is preferably at least 50° C. In embodiments where the polymer includes both a suitable amount of both bicyclic groups (more preferably unsaturated bicyclic groups) and at least tricyclic groups (more preferably tricyclic groups such as is provided by TCDM), the polymer may have any suitable Tg, but in presently preferred embodiments has a Tg from 80 to 125° C.

The molecular weight of the polymer of the invention can vary depending upon material choice and the desired end use. In preferred embodiments, the polymer has a number average molecular weight (Mn) of at least about 1,000, more preferably at least about 1,500, and even more preferably at least about 3,000. Preferably, the Mn of the polymer is less than about 20,000, more preferably less than about 15,000, and even more preferably less than about 10,000.

The backbone of the polymer may have any suitable terminal groups. In some embodiments, the backbone of the polymer is hydroxyl-terminated and/or carboxyl-terminated, more preferably hydroxyl-terminated.

The polymer may have any suitable hydroxyl number. Hydroxyl numbers are typically expressed as milligrams of potassium hydroxide (KOH) equivalent to the hydroxyl content of 1 gram of the hydroxyl-containing substance. In certain preferred embodiments, the polymer has a hydroxyl number of from 0 to about 150, even more preferably from about 5 to about 100, and optimally from about 10 to about 80.

The polymer may have any suitable acid number. Acid numbers are typically expressed as milligrams of KOH required to titrate a 1-gram sample to a specified end point. Methods for determining acid numbers are well known in the art. The range of suitable acid numbers may vary depending on a variety of considerations including, for example, whether water dispersibility is desired. In some embodiments, the polymer has an acid number of at least about 5, more preferably at least about 15, and even more preferably at least about 30. Depending on the desired monomer selection, in certain embodiments (e.g., where a solvent-based coating composition is desired), the polymer has an acid number of less than about 40, less than about 10, or less than about 5.

In some embodiments, the polymers of the invention are unsaturated. Preferred such polymers include unsaturated bicyclic groups such as, for example, those having a structure pursuant to the aforementioned Expression (I). Iodine value is a useful measure for characterizing the average number of non-aromatic double bonds present in a material. Polymers of the invention may have any suitable iodine value to achieve the desired result. In embodiments where the polymer includes unsaturated bicyclic groups, the polymer preferably has an iodine value of at least about 10, more preferably at least about 20, even more preferably at least about 35, and optimally at least about 50. The upper range of suitable iodine values is not limited, but in most embodiments the iodine value typically will not exceed about 120. Iodine values are typically expressed in terms of centigrams of iodine per gram of resin and may be determined, for example, using the testing methodology provided in the Test Methods section of WO 2010/118356. In some embodiments, the polymer preferably includes a number of unsaturated bicyclic groups sufficient to yield an iodine value of at least 5, at least 10, at least 20, at least 35, or at least 50 (before factoring in the portion of the total iodine value of the polymer attributable to any other carbon-carbon double bonds that may optionally be present in the polymer).

As previously discussed, in certain preferred embodiments the polymer is a polyester or polyester copolymer (e.g. polyester-urethane polymer). Examples of suitable polycarboxylic acids for use in forming polyester portions of the polymer, or precursors thereof, include dicarboxylic acids and polyacids having higher acid functionality (e.g., tricarboxylic acids, tetracarboxylic acids, etc.), precursors or derivatives thereof (e.g., an esterifiable derivative of a polycarboxylic acid, such as a dimethyl ester or anhydride), or mixtures thereof. Diacids are presently preferred. Suitable polycarboxylic acids may include, for example, maleic acid, fumaric acid, succinic acid, adipic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, tetrahydrophthalic acid, isophthalic acid, trimellitic acid, terephthalic acid, naphthalene dicarboxylic acid, cyclohexane-dicarboxylic acid, glutaric acid, dimer fatty acids, any of the other acids or anhydrides disclosed herein, anhydrides or derivatives thereof, and mixtures thereof. If desired, adducts of polyacid compounds (e.g., triacids, tetraacids, etc.) and monofunctional compounds may be used. An example of one such adduct is pyromellitic anhydride pre-reacted with benzyl alcohol.

Examples of suitable polyols for use in forming polyester portions of the polymer, or precursors thereof, include diols, polyols having three or more hydroxyl groups (e.g., triols, tetraols, etc.), and combinations thereof. Diols are presently preferred. Suitable polyols may include, for example, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol, isopropylidene bis(p-phenylene-oxypropanol-2), any of the other polyols disclosed herein, and mixtures thereof. If desired, adducts of polyol compounds (e.g., triols, tetraols, etc.) and monofunctional compounds may be used. An example of one such adduct is dipentaerythritol pre-reacted with benzoic acid.

As previously discussed, in certain embodiments, the polymer of the invention includes urethane linkages, preferably in a backbone of the polymer. Polyester-urethane polymers (i.e., polymers including both ester and urethane linkages, and more preferably a plurality of each linkage type) are preferred polyurethane polymers. For sake of convenience, the term "polyurethane" is used in the discussion that follows and is intended to encompass polyester-urethane polymers.

Polyurethane polymers of the invention are typically formed via reaction of ingredients including an isocyanate (more preferably a polyisocyanate) and a polyol (more preferably a diol). The reactants can be monomer reactants, oligomer reactants, polymer reactants, or a combination thereof. In some embodiments, one or both of the polyisocyanate and the polyol are an oligomer or polymer. The reactants used to produce the polyurethane polymer (e.g., one or more polyol and one or more polyisocyanate) may include any suitable ratio of isocyanate to hydroxyl groups. In some embodiments (e.g., where terminal hydroxyl groups are desired), the ratio of isocyanate to hydroxyl groups (NCO:OH) is preferably from 2:1 to 1:1. In certain other embodiments (e.g., where terminal NCO groups are desired) the ratio of isocyanate to hydroxyl groups (NCO:OH) is preferably less than 1:1.

Preferred polyurethane polymers of the invention are formed via reaction of a polyisocyanate compound and a hydroxyl-functional polyester oligomer or polymer, more preferably a hydroxyl-terminated polyester oligomer or polymer. Preferred hydroxyl-functional polyester oligomers or polymers have a hydroxyl number of about 15 to about 200, more preferably about 25 to about 150, and even more preferably about 35 to about 115. Preferred polymers of the invention constitute at least 50 wt-% (including, for example, >80 wt-%, >90 wt-%, >95 wt-%, etc.) of polyester segments.

The molecular weight of the polyester oligomer or polymer may vary widely depending upon, for example, the desired molecular weight of the polyurethane polymer and/or the number of polyisocyanate molecules to be incorporated into the polyurethane polymer. For example, to prepare a polyurethane polymer having a desired molecular weight, two molecules of a polyester oligomer or polymer having a molecular weight of "X" could be used or, alternatively, four molecules of a polyester oligomer or polymer having a molecular weight of one-half X could be used. In certain preferred embodiments, the polyester oligomer or polymer has a number average molecular weight (Mn) of preferably about 500 to about 10,000, more preferably about 750 to about 7,000, and even more preferably about 1,000 to about 5,000.

The isocyanate may be any suitable compound, including an isocyanate compound having 1 isocyanate group; a polyisocyanate compound having 2, 3, or 4 or more isocyanate groups; or a mixture thereof. Suitable diisocyanates may include isophorone diisocyanate (i.e., 5-isocyanato-1-isocyanatomethyl-1,3,3-trimethylcyclohexane); 5 isocyanato-1-(2-isocyanatoeth-1-yl)-1,3,3-trimethylcyclohexane; 5-isocyanato-1-(3-isocyanatoprop-1-yl)-1,3,3-trimethylcyclohexane; 5-isocyanato-(4-isocyanatobut-1-yl)-1,3,3-trimethylcyclohexane; 1-isocyanato-2-(3-isocyanatoprop-1-yl)cyclohexane; 1-isocyanato-2-(3-isocyanatoeth-1-yl)cyclohexane; 1-isocyanato-2-(4-isocyanatobut-1 yl)cyclohexane; 1,2-diisocyanatocyclobutane; 1,3-diisocyanatocyclobutane; 1,2 diisocyanatocyclopentane; 1,3-diisocyanatocyclopentane; 1,2-diisocyanatocyclohexane; 1,3-diisocyanatocyclohexane; 1,4-diisocyanatocyclohexane; dicyclohexylmethane 2,4'-diisocyanate; trimethylene diisocyanate; tetramethylene diisocyanate; pentamethylene diisocyanate; hexamethylene diisocyanate; ethylethylene diisocyanate; trimethylhexane diisocyanate; heptamethylene diisocyanate; 2-heptyl-3,4-bis(9-isocyanatononyl)-1-pentyl-cyclohexane; 1,2-, 1,4-, and 1,3-bis(isocyanatomethyl)cyclohexane; 1,2-, 1,4-, and 1,3 bis(2-isocyanatoeth-1-yl)cyclohexane; 1,3-bis(3-isocyanatoprop-1-yl)cyclohexane; 1,2-, 1,4- or 1,3-bis(4-isocyanatobuty-1-yl)cyclohexane; liquid bis(4-isocyanatocyclohexyl)-methane; and derivatives or mixtures thereof.

In some embodiments, the isocyanate compounds are preferably non-aromatic. Non-aromatic isocyanates are particularly desirable for coating compositions intended for use on an interior surface of a food or beverage container. Isophorone diisocyanate (IPDI) and hexamethylene diisocyanate (HMDI) are preferred non-aromatic isocyanates.

In some embodiments, at least some, or alternatively all, of the one or more isocyanate compounds may be a partially blocked polyisocyanate. Certain embodiments may benefit from the inclusion of one or more blocked isocyanate groups (e.g., deblockable isocyanate groups) in the polyurethane polymer as a means for forming covalent linkages with other components of the coating composition, including, for example, the polyurethane polymer itself. Preferred partially blocked polyisocyanates contain, on average: (i) at least about 1.5, more preferably at least about 1.8, and even more preferably at least about 2 free (or unblocked) isocyanate groups per molecule of partially blocked polyisocyanate and on average, and (ii) at least about 0.5, more preferably at least about 0.7, and even more preferably at least about 1 blocked isocyanate groups (preferably deblockable isocyanate groups) per molecule of partially blocked polyisocyanate. Presently preferred blocking agents for forming deblockable isocyanate groups include ε-caprolactam, diisopropylamine (DIPA), methyl ethyl ketoxime (MEKO), and mixtures thereof. For further discussion of suitable materials and methodologies relating to the use of partially blocked isocyanate compounds in forming polyurethane polymers see co-pending PCT Application PCT/US2009/065848.

Preferred polyurethane polymers of the invention (more preferably polyester-urethane polymers) include a sufficient number of urethane linkages to provide the desired coating properties for the desired end use. Such coating properties may include, for example, flexibility, abrasion resistance, and/or fabrication (e.g., to accommodate stamping processes used to form articles such as, for example, riveted beverage can ends from coated planar metal substrate). Preferred such polymers preferably include on average at least about 1 urethane linkages, more preferably at least about 2 urethane linkages, and even more preferably at least about 5 urethane linkages per molecule of the polymer. While the number of urethane linkages present in the polymer is not particularly restricted on the high end and may vary depending upon molecular weight, in certain embodiments, the polymer includes on average less than about 15 urethane linkages, less than about 10 urethane linkages, or less than about 7 urethane linkages per molecule of the polymer.

Isocyanate content may be another useful measure of the number of urethane linkages present in a polymer. In certain embodiments, the polymer is formed from reactants including, based on total nonvolatiles, at least about 0.1 wt-%, more preferably at least about 1 wt-%, and even more preferably at least about 5 wt-% of an isocyanate compound. The upper amount of suitable isocyanate compound concentration is not particularly limited and will depend upon the molecular weight of the one or more isocyanate compounds utilized as reactants. Typically, however, the polymer is formed from reactants including, based on total nonvolatiles, less than about 35 wt-%, more preferably less than about 30 wt-%, and even more preferably less than about 25 wt-% of an isocyanate compound. Preferably, the isocyanate compound is incorporated into a backbone of the polymer via a urethane linkage, and more preferably a pair of urethane linkages.

If desired, the polyurethane polymer may be optionally chain extended to increase the molecular weight of the polymer. The resulting molecular weight may be outside the ranges recited previously herein. For example, after optional chain extension, the polyurethane polymer may have an Mn of at least 5,000, at least 10,000, or at least 30,000. Chain-extending techniques and materials such as those described in WO 2011/009040 can be used. The polymer may be chain extended, for example, by reacting one or more chain extenders with terminal and/or pendant isocyanate groups present on the polyurethane polymer. Suitable chain extenders may include, for example, alkyl amino alcohols, cycloalkyl amino alcohols, heterocyclic amino alcohols, polyamines (e.g., ethylene diamine, diethylene triamine, triethylene tetra amine, melamine, etc.), hydrazine, substituted hydrazine, hydrazide, amides, water, other suitable compounds having active hydrogen groups, ketimines prepared from any of the above amines, and combinations thereof. Preferably, the chain extension is conducted with organic polyamines, more preferably aliphatic polyamines having at least two primary amine groups. Diamines are preferred chain extenders. If a chain extender is utilized, the linkage formed between the chain extender and the polyurethane prepolymer is typically a urethane or urea linkage, more typically a urea linkage.

In an embodiment, the polymer of the invention is formed from reactants including: 0 to 55 wt-% of an at least tricyclic group containing monomer; 0 to 19 wt-% of an unsaturated bicyclic group containing monomer; and 0 to 17 wt-% of an isocyanate compound. A representative such polymer is a polyester-urethane polymer formed from reactant including: 17 to 33 wt-% of TCDM (or other suitable at least tricyclic group containing monomer), 5 to 17 wt-% of nadic anhydride (or other suitable unsaturated bicyclic group containing monomer), and 8 to 19 wt-% of IPDI (or other suitable polyisocyanate compound). It is contemplated that one or more of the aforementioned monomers may be present in an oligomer or polymer reactant used to form the polymer, in which case the aforementioned weight percentages refer to the total weight of the structural units of the oligomer or polymer reactant derived from the specified monomer relative to the total weight of the final polymer.

If water dispersibility is desired, the polymer can be made water dispersible using any suitable means, including the use of non-ionic water-dispersing groups, salt groups (e.g., anionic and/or cationic salt groups), surfactants, or a combination thereof. Preferred water-dispersible polymers contain a suitable amount of salt-containing (e.g., anionic and/or cationic salt groups) and/or salt-forming groups to facilitate preparation of an aqueous dispersion or solution. Suitable salt-forming groups may include neutralizable groups such as acidic or basic groups. At least a portion of the salt-forming groups may be neutralized to form salt groups useful for dispersing the polymer into an aqueous carrier. Acidic or basic salt-forming groups may be introduced into the polymer by any suitable method.

Non-limiting examples of anionic salt groups include neutralized acid or anhydride groups, sulphate groups ($-OSO_3^-$), phosphate groups ($-OPO_3^-$), sulfonate groups ($-SO_2O^-$), phosphinate groups ($-POO^-$), phosphonate groups ($-PO_3^-$), and combinations thereof. Non-limiting examples of suitable cationic salt groups include:

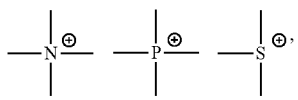

(referred to, respectively, as quaternary ammonium groups, quaternary phosphonium groups, and tertiary sulfate groups) and combinations thereof. Non-limiting examples of non-ionic water-dispersing groups include hydrophilic groups such as ethylene oxide groups. Compounds for introducing the aforementioned groups into polymers are known in the art. In some embodiments, a water-dispersible polymer of the invention may be achieved through inclusion of a sufficient number of carboxylic acid groups in the polymer. Non-limiting examples of suitable materials for incorporating such groups into the polymer include anhydrides or polyanhydrides such as tetrahydrophthalic anhydride, pyromellitic anhydride, pyromellitic dianhydride, succinic anhydride, trimilletic anhydride ("TMA"), and mixtures thereof. In one embodiment, a hydroxyl-terminated polyester polymer or oligomer having one or more pendant hydroxyl groups is reacted with an anhydride such as TMA to produce a hydroxyl-terminated polyester having carboxylic functionality. The conditions of the reaction are preferably controlled, including the temperature, to avoid gelling. The resulting carboxylic-functional polyester oligomer or polymer is neutralized (e.g., using a base such as an amine) to produce an aqueous dispersion. In some embodiments, it is contemplated that water dispersibility may be provided through use of acid-functional ethylenically unsaturated monomers that have been grafted onto the polymer, whereby a suitable number of the acid-functional groups are neutralized with base (such as, e.g., a tertiary amine) to produce salt groups. See for example, U.S. Pat. Application No. 20050196629 for examples of such techniques.

Coating compositions of the invention may include any suitable amount of polymer of the invention to produce the desired result. In preferred embodiments, the coating composition includes at least a film-forming amount of the polycyclic-functional polymer of the invention, preferably from about 10 to about 100 wt-%, more preferably at least about 40 wt-%, even more preferably at least about 60 wt-%, and even more preferably at least about 70 wt-% of the polycyclic-functional polymer, based on the total nonvolatile weight of the coating composition. Preferably, the coating composition includes less than about 99 wt-%, more preferably less than about 95 wt-%, and even more preferably less than about 80 wt-% of polycyclic-functional polymer, based on the total nonvolatile weight of the coating composition.

Preferred polymers and/or coating compositions of the invention are preferably substantially free, more preferably essentially free, even more preferably essentially completely free, and optimally completely free of mobile bisphenol A (BPA) and aromatic glycidyl ether compounds (e.g., diglycidyl ethers of bisphenol (BADGE), diglycidyl ethers of bisphenol F (BFDGE), and epoxy novalacs). In certain preferred embodiments, the polymer and/or coating composition of the inventions are preferably substantially free, more preferably essentially free, even more preferably essentially completely free, and optimally completely free of bound BPA and aromatic glycidyl ether compounds (e.g., BADGE, BFDGE and epoxy novalacs).

In some embodiments, the polymer and/or coating composition is at least substantially "epoxy-free," more preferably "epoxy-free." The term "epoxy-free," when used herein in the context of a polymer, refers to a polymer that does not include any "epoxy backbone segments" (i.e., segments formed from reaction of an epoxy group and a group reactive with an epoxy group). Thus, for example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments. The coating composition of the invention is also preferably at least substantially epoxy-free, more preferably epoxy-free.

In some embodiments, the coating composition of the invention is "PVC-free." That is, each composition preferably contains less than 2 wt-% of vinyl chloride materials, more preferably less than 0.5 wt-% of vinyl chloride materials, and even more preferably less than 1 ppm of vinyl chloride materials.

When present, the concentration of one or more optional crosslinkers in the coating composition may vary depending upon the desired result. For example, in some embodiments, the coating composition may contain from about 0.01 to about 50 wt-%, more preferably from about 5 to about 50 wt-%, even more preferably from about 10 to about 40 wt-%, and optimally from about 15 to about 30 wt-% of one or more crosslinkers, by weight of nonvolatile material in the coating composition.

Any suitable crosslinker or combination of crosslinkers can be used. For example, phenolic crosslinkers (e.g., phenoplasts), amino crosslinkers (e.g., aminoplasts), blocked isocyanate crosslinkers, epoxy-functional crosslinkers, and combinations thereof, may be used. Preferred crosslinkers are at least substantially free, more preferably completely free, of bound BPA and aromatic glycidyl ethers.

Examples of suitable phenolic crosslinkers include the reaction products of aldehydes with phenols. Formaldehyde and acetaldehyde are preferred aldehydes. Non-limiting examples of suitable phenols that can be employed include phenol, cresol, p-phenylphenol, p-tert-butylphenol, p-tert-amylphenol, cyclopentylphenol, cresylic acid, BPA (not presently preferred), and combinations thereof.

Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, urea-formaldehyde-based resins, and mixtures thereof.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, CYMEL 301, CYMEL 303, CYMEL 370, CYMEL 373, CYMEL 1125, CYMEL 1131, CYMEL 5010 and MAPRENAL MF 980 (all available from Cytec Industries Inc., West Patterson, N.J.), and URAMEX BF 892 (available from DSM, Netherlands).

Non-limiting examples of blocked isocyanate crosslinkers include aliphatic and/or cycloaliphatic blocked polyisocyanates such as HDI (hexamethylene diisocyanate), IPDI (isophorone diisocyanate), TMXDI (bis[4-isocyanatocyclohexyl]methane), $H_{12}MDI$ (tetramethylene-m-xylidene diisocyanate), TMI (isopropenyldimethyl-benzylisocyanate) and dimers or trimers thereof. Suitable blocking agents include, for example, n-butanone oxime, $\epsilon$-caprolactam, diethyl malonate, and secondary amines. Non-limiting examples of suitable commercially available blocked isocyanate crosslinkers include VESTANAT B 1358 A, VESTANAT EP B 1186 A, VESTANA EP B 1299 SV (all available from Degussa Corp., Marl, Germany); and DESMODUR VPLS 2078 and DESMODURBL 3175 (available from Bayer A. G., Leverkusen, Germany). In some embodiments, blocked isocyanates may be used that have an Mn of at least about 300, more preferably at least about 650, and even more preferably at least about 1,000.

In embodiments where the polymer includes unsaturated bicyclic groups, and more preferably unsaturated bridged bicyclic groups such as norbornene groups, it may be advantageous to utilize the polymer in combination with a phenolic crosslinker, with resole phenolic crosslinkers being particularly preferred. While not intending to be bound by any theory, cured packaging coatings formulated using such a combination of polymer and resole-type phenolic crosslinker (with or without additional crosslinkers such as, e.g., non-resole phenolic crosslinkers, amino crosslinkers, and/or blocked isocyanate) have been observed to exhibit superior coating properties relative to comparable cured packaging coatings formulated without resole-type phenolic crosslinkers. In preferred embodiments, upon curing of the coating, the resole-type phenolic crosslinker is believed to form a covalent bond with the unsaturated bicyclic group, resulting in the formation of a crosslinked polymer network including both the phenolic crosslinker and the polymer. While not intending to be bound by any theory, this is believed to be responsible, at least in part, for the enhanced coating properties exhibited by certain preferred packaging coatings of the invention relative to certain conventional packaging coatings containing, for example, polyester and phenolic resins that do not form, or do not appreciably form, such a polymer network with each other.

One preferred optional ingredient is a catalyst to increase the rate of cure and/or the extent of crosslinking. Non-limiting examples of catalysts, include, but are not limited to, strong acids (e.g., dodecylbenzene sulphonic acid (DDBSA), available as CYCAT 600 from Cytec, methane sulfonic acid (MSA), p-toluene sulfonic acid (pTSA), dinonylnaphthalene disulfonic acid (DNNDSA), and triflic acid), quaternary ammonium compounds, phosphorous compounds, tin, titanium, and zinc compounds, and combinations thereof. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material in the coating composition. If used, a catalyst is preferably present in an amount of no greater than 3 wt-%, and more preferably no greater than 1 wt-%, based on the weight of nonvolatile material in the coating composition.

If desired, coating compositions of the invention may optionally include other additives that do not adversely affect the coating composition or a cured coating resulting therefrom. The optional additives are preferably at least substantially free of mobile and/or bound BPA and aromatic glycidyl ether compounds (e.g., BADGE, BFDGE and epoxy novalac compounds) and are more preferably completely free of such compounds. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are carriers, additional polymers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents or combinations thereof. Each optional ingredient can be included in a sufficient amount to serve its intended purpose, but preferably not in such an amount to adversely affect a coating composition or a cured coating resulting therefrom.

Any suitable carrier may be used to prepare coating compositions of the invention. Suitable carriers include carrier liquids such as organic solvents, water, and mixtures thereof. Preferably, the liquid carrier(s) are selected to provide a dispersion or solution of the polymer of the invention for further formulation. Suitable organic solvents include aliphatic hydrocarbons (e.g., mineral spirits, kerosene, high flashpoint VM&P naphtha, and the like); aromatic hydrocarbons (e.g., benzene, toluene, xylene, solvent naphtha 100, 150, 200 and the like); alcohols (e.g., ethanol, n-propanol, isopropanol, n-butanol, iso-butanol and the like); ketones (e.g., acetone, 2-butanone, cyclohexanone, methyl aryl ketones, ethyl aryl ketones, methyl isoamyl ketones, and the like); esters (e.g., ethyl acetate, butyl acetate and the like); glycols (e.g., butyl glycol); glycol ethers (e.g., ethylene glycol monomethyl ether, ethylene glycol monoethyl ether, ethylene glycol monobutyl ether, propylene glycol monomethyl ether, methoxypropanol and the like); glycol esters (e.g., butyl glycol acetate, methoxypropyl acetate and the like); and mixtures thereof.

If present, the amount of liquid carrier included in the coating composition will vary, for example, depending upon the application method and the desired amount of solids. Preferred embodiments of the coating composition include at least 30 wt-% of liquid carrier, more preferably at least 35 wt-%, and even more preferably at least 45 wt-%. In such embodiments, the coating composition will typically include less than 85 wt-% of liquid carrier, more typically less than 80 wt-% of liquid carrier.

In some embodiments, the coating composition is a solvent-based coating composition that preferably includes no more than a de minimus amount (e.g., 0 to 2 wt-%) of water. In other embodiments, the coating composition can include a substantial amount of water.

In some embodiments, the coating composition of the invention is a water-based varnish. As already discussed, the polymer of the invention may include water-dispersing groups such as salt groups. In some embodiments, preferably at least about 50 wt-% of the liquid carrier system is water, more preferably at least about 60 wt-% is water, and even more preferably at least about 75 wt-% is water. Certain coating compositions of the invention may include at least about 10 wt-% of water, more preferably at least about 20 wt-% of water, and even more preferably at least about 40 wt-% of water (in some embodiments about 50 wt-% or more of water), based on the total weight of the coating composition.

Coating compositions of the invention may be prepared by conventional methods in various ways. For example, the coating compositions may be prepared by simply admixing the polymer of the invention, optional crosslinker and any other optional ingredients, in any desired order, with sufficient agitation. The resulting mixture may be admixed until all the composition ingredients are substantially homogeneously blended. Alternatively, the coating compositions may be prepared as a liquid solution or dispersion by admixing an optional carrier liquid, the polymer of the invention, optional crosslinker, and any other optional ingredients, in any desired order, with sufficient agitation. An additional amount of carrier liquid may be added to the coating compositions to adjust the amount of nonvolatile material in the coating composition to a desired level.

The total amount of solids present in coating compositions of the invention may vary depending upon a variety of factors including, for example, the desired method of application. Presently preferred coating compositions include at least about 20, more preferably at least about 30, and even more preferably at least about 40 wt-% of solids, based on the total weight of the coating composition. In certain preferred embodiments, the coating composition includes less than about 80, more preferably less than about 70, and even more preferably less than about 65 wt-% of solids, based on the total weight of the coating composition. The solids of the coating composition may be outside the above ranges for certain types of applications.

Cured coatings of the invention preferably adhere well to metal (e.g., steel, tin-free steel (TFS), tin plate, electrolytic tin plate (ETP), aluminum, etc.) and provide high levels of resistance to corrosion or degradation that may be caused by prolonged exposure to products such as food or beverage products. The coatings may be applied to any suitable surface, including inside surfaces of containers, outside surfaces of containers, container ends, and combinations thereof.

The coating composition of the invention can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating.

The coating composition can be applied on a substrate prior to, or after, forming the substrate into an article. In some embodiments, at least a portion of a planar substrate is coated with one or more layers of the coating composition of the invention, which is then cured before the substrate is formed into an article (e.g., via stamping, drawing, or draw-redraw).

After applying the coating composition onto a substrate, the composition can be cured using a variety of processes, including, for example, oven baking by either conventional or convectional methods. The curing process may be performed in either discrete or combined steps. For example, the coated substrate can be dried at ambient temperature to leave the coating composition in a largely un-crosslinked state. The coated substrate can then be heated to fully cure the coating composition. In certain instances, the coating composition can be dried and cured in one step. In preferred embodiments, the coating composition of the invention is a heat-curable coating composition.

The curing process may be performed at any suitable temperature, including, for example, temperatures in the range of about 180° C. to about 250° C. If metal coil is the substrate to be coated, curing of the applied coating composition may be conducted, for example, by subjecting the coated metal to an elevated temperature environment of about 210° C. to about 232° C. for a suitable time period (e.g., about 15 to 30 seconds). If metal sheeting is the substrate to be coated (e.g., such as used to make three-piece food cans), curing of the applied coating composition may be conducted, for example, by subjecting the coated metal to an elevated temperature environment of about 190° C. to about 210° C. for a suitable time period (e.g., about 8 to about 12 minutes).

Coating compositions of the invention may be useful in a variety of coating applications. As previously discussed, the coating compositions are particularly useful as adherent coatings on interior or exterior surfaces of metal packaging containers. Non-limiting examples of such articles include closures (including, e.g., internal surfaces of twist-off caps for food and beverage containers); internal crowns; two and three-piece cans (including, e.g., food and beverage containers); shallow drawn cans; deep drawn cans (including, e.g., multi-stage draw and redraw food cans); can ends (including, e.g., easy open can ends or beverage can ends); monobloc aerosol containers; medical packaging containers such as metered dose inhaler ("MDI") cans for use in storing and administering pharmaceuticals; and general industrial containers, cans, and can ends. Preferred coating compositions of the invention are particularly suited for use on interior or exterior surfaces of metal food or beverage containers, including as food-contact coatings.

Preferred food-contact coating compositions of the invention, when suitably cured on metal packaging substrate exhibit one or more of the following properties after retort in a test substance such as one used in the below Examples: an adhesion of at least 8, more preferably at least 9, and optimally 10; a blush resistance of at least 8, and more preferably at least 9; a wedge bend of at least 70%; and/or at least 30 MEK double rubs. Suitable methods for testing these properties are described in the below Test Methods Section.

Some additional non-limiting embodiments of the invention are provided below.

A. A composition comprising: a polymer having a backbone or pendant polycyclic group (more preferably a backbone polycyclic group).
B. An article, comprising: a metal substrate having the composition of Embodiment A applied on at least a portion of a major surface of the metal substrate.
C. A method comprising: providing the composition of Embodiment A, and applying the composition on at least a portion of a metal substrate.
D. Any of Embodiments A-C, wherein the polymer is a polyester polymer or a polyester-urethane polymer having both backbone ester and urethane linkages.
E. Any of Embodiments A-D, wherein the one or more polycyclic groups constitute at least about 10 wt-%, more preferably at least about 20 wt-%, and even more preferably at least 30 wt-% of the polymer, based on the weight percent of polycyclic-group-containing monomer relative to the total weight of the polymer.
F. Any of Embodiments A-E, wherein the one or more polycyclic groups comprises a saturated bicyclic group (which can optionally include one or more unsaturated and/or aromatic organic groups attached to either of the saturated spiro, fused, and/or bridged rings of the bicyclic group), an unsaturated bicyclic group, an aromatic bicyclic group, an at least tricyclic group, or a combination thereof.

G. Any of Embodiments A-F, wherein the polymer has a glass transition temperature of at least 50° C., and more preferably at least 70° C.

H. Any of Embodiments A-G, wherein the one or more polycyclic groups is a saturated group.

I. Any of Embodiments A-H, wherein the one or more polycyclic groups is a bicyclic group.

J. A composition, article, or method of Embodiment I, wherein one or both cyclic groups of the bicyclic group are aromatic.

K. A composition, article, or method of Embodiment I, wherein one or both cyclic groups of the bicyclic group are unsaturated.

L. Any of Embodiments A-H, wherein the one or more polycyclic groups is an at least tricyclic group.

M. The composition, article, or method of Embodiment L, where the at least tricyclic group includes a substituted or unsubstituted tricyclodecane group.

N. The composition, article, or method of Embodiment M, wherein the tricyclodecane group is provided by tricyclodecane dimethanol, tricyclodecane diamine, tricyclodecane diisocyanate, or a derivative or mixture thereof.

O. Any of Embodiments A-M, wherein the polycyclic group includes one or more heteroatoms in a ring of the polycyclic group.

P. Any of Embodiments A-I, wherein the polycyclic group is derived from a sugar feedstock.

Q. The composition, article, or method of Embodiment P, wherein the polycyclic group is derived from isosorbide, isomannide, or isoiodide.

R. Any of Embodiments A-Q, wherein the coating composition, based on total weight solids, includes at least 10 wt-%, more preferably at least 40 wt-%, and even more preferably at least 60 wt-% of the polymer.

S. Any of Embodiments A-R, wherein the coating composition further comprises one or more crosslinkers, preferably in an amount of at least 5 wt-%.

T. The composition, article, or method of Embodiment S, wherein the one or more crosslinkers comprises an amino crosslinker, a phenolic crosslinker, a blocked isocyanate crosslinker, or a mixture thereof.

U. Any of Embodiments A-T, wherein the coating composition further comprises a liquid carrier.

V. The composition, article, or method of Embodiment U, wherein the coating composition is a water-based coating composition and/or a solvent-based coating composition.

W. Any of Embodiments A-V, wherein the polymer includes both: (i) one or more bicyclic groups (e.g., saturated bicyclic groups, unsaturated bicyclic groups, one or more of each of saturated and unsaturated bicyclic groups, etc.), more preferably one or more unsaturated bicyclic groups such as, e.g., one or more substituted or unsubstituted norbornene groups, and (ii) one or more at least tricyclic groups (e.g., one or more substituted or unsubstituted tricyclodecane groups).

Test Methods

Unless indicated otherwise, the following test methods were utilized in the Examples that follow.

A. Retort Method

This test provides an indication of an ability of a coating to withstand conditions frequently associated with food or beverage preservation or sterilization. Coated substrate samples (in the form, e.g., of ETP or TFS flat panels) are placed in a vessel and partially immersed in a test substance. While immersed in the test substance, the coated substrate samples are placed in an autoclave and subjected to heat of 130° C. and pressure of 1 atm above atmospheric pressure for a time period of 60 minutes. Just after retort, the coated substrate samples are tested for adhesion, blush resistance, and/or stain resistance.

B. Adhesion Test

Adhesion testing is performed to assess whether the coating compositions adhere to the coated substrate. The Adhesion Test is performed according to ASTM D 3359—Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. A coating is considered herein to satisfy the Adhesion Test if it exhibits an adhesion rating of at least 8.

C. Blush Resistance Test

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush, a rating of "8" indicates slight whitening of the film, and a rating of "5" indicates whitening of the film, and so on.

D. Solvent Resistance Test

The extent of "cure" or crosslinking of a coating is measured as a resistance to solvents, such as methyl ethyl ketone (MEK) or isopropyl alcohol (IPA). This test is performed as described in ASTM D 5402-93. The number of double rubs (i.e., one back-and-forth motion) is reported. Preferably, the MEK solvent resistance is at least 30 double rubs.

E. Wedge Bend Test

This test provides an indication of a level of flexibility of a coating and an extent of cure. Test wedges are formed from coated rectangular metal test sheets (which measured 12 cm long by 5 cm wide). Test wedges are formed from the coated sheets by folding (i.e., bending) the sheets around a mandrel. To accomplish this, the mandrel is positioned on the coated sheets so that it is oriented parallel to, and equidistant from, the 12 cm edges of the sheets. The resulting test wedges have a 6 mm wedge diameter and a length of 12 cm. To assess the wedge bend properties of the coatings, the test wedges are positioned lengthwise in a metal block of a wedge bend tester and a 2.4 kg weight is dropped onto the test wedges from a height of 60 cm.

The deformed test wedges are then immersed in a copper sulphate test solution (prepared by combining 20 parts of $CuSO_4.5H_2O$, 70 parts of deionized water, and 10 parts of hydrochloric acid (36%)) for about 2 minutes. The exposed metal is examined under a microscope and the millimeters of coating failure along the deformation axis of the test wedges was measured. The data is expressed as a wedge bend percentage using the following calculation:

$$100\% \times [(120\ mm) - (mm\ of\ failure)]/(120\ mm).$$

A mono-coat coating system is considered herein to satisfy the Wedge Bend Test if it exhibits a wedge bend percentage of 70% or more, whereas a two-coat coating system is considered herein to satisfy the test if it exhibits a wedge bend percentage of 85% or more.

F. Porosity Test

This test provides an indication of the level of flexibility of a coating. Moreover, this test measures the ability of a coating to retain its integrity as it undergoes the formation process necessary to produce a food or beverage can end. In particular, it is a measure of the presence or absence of cracks or fractures in the formed end. To be suitable for food or beverage can end applications, a coating composition should preferably exhibit sufficient flexibility to accommodate the extreme contour of the rivet portion of the easy open food or beverage can end.

The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted 206 standard opening can ends are exposed for a period of 4 seconds to an electrolyte solution comprised of 1% NaCl by weight in deionized water. Metal exposures are measured using a WACO Enamel Rater II, available from the Wilkens-Anderson Company, Chicago, Ill., with an output voltage of 6.3 volts. The measured electrical current, in milliamps, is reported. End continuities are typically tested initially and then after the ends are subjected to pasteurization or retort.

A coating is considered herein to satisfy the Porosity Test if it passes an electric current (after end formation) of less than about 10 milliamps (mA) when tested as described above.

EXAMPLES

The following examples are offered to aid in understanding of the present invention and are not to be construed as limiting the scope thereof. Unless otherwise indicated, all parts and percentages are by weight, and all molecular weights are number average molecular weights.

Example 1

Polyester-Urethane Including Tricyclodecane Groups

Tricyclodecane dimethanol (455 grams ("g")), 1,4 butane diol (85 g), terephthalic acid (490 g), polymerization catalyst (1.25 g), and AROMATIC 150 solvent (50 g) were added to a glass reaction flask equipped with a stirrer, nitrogen inlet and reflux condenser. The condenser was further equipped with a Dean-Stark flask to capture and quantify the water evolved during the reaction. The reactor was set for 225-235° C. After approximately 12 hours, the acid value of the resulting polyester polymer was approximately 42.3 mg KOH/g. The molecular weight of this prepolymer was about 2650 g/mol. To this polymer was added dibutyl tin dilaureate (DBTDL) (1.5 g) and isophorone diisocyanate (IPDI) (150 g). This reaction was allowed to proceed at 100° C. until all of the isocyanate was consumed. The final molecular weight was 15,400 Daltons.

Example 2

Polyester-Urethane Including Isosorbide Groups

Neopentyl glycol (566 g), monoethylenglycol (91 g), isosorbide (328 g) (from Archers Daniels Midland), dimer fatty acid (654 g) (RADIACID 960 product from Oleon), isophthalic acid (1152 g), and polymerization catalyst (1.25 g) were added to a glass reaction flask equipped with a stirrer, nitrogen inlet, partial condenser, decanter and reflux condenser. The contents of the glass were progressively heated to 240° C. while the temperature at the top of the partial condenser was less than 102° C. and the contents were maintained at 240° C. until the acid value was about 15 to 20. Esterification water was removed continuously. When the acid value was about 15 to 20, the product was cooled to 180° C., the partial condenser was removed and replaced by a total condenser equipped with a Dean-Stark flask to capture and quantify the water evolved during the reaction. Xylene (131 g) was added. The product was then slowly heated to maintain a gentle reflux. The temperature of the product was increased to 225° C.-235° C. When the acid value was in the range of 5-10 and the cut viscosity (75% in Xylene) was in the range of 110-120 Poises at 25° C., the product was cooled. When the temperature of the product reached 200° C., the non-volatile content (NVC) was reduced to 70% with SOLVESSO 100 solvent.

The resulting 70% polyester product (1,342 g) was added to a glass reaction flask equipped with a stirrer and nitrogen inlet and heated to 95-100° C. Partially blocked polyisocyanate (described below) (365 g) was added over 10 minutes and immediately after SOLVESSO 100 solvent (75 g) was added. The product was held at 95-100° C. until the cut viscosity at 55% NVC in Butanol reached 25-30 Poises at 25° C. and NCO content was less than 0.05%.

Then, butanol (162 g) was added and the mixture was mixed for 30 minutes at 80° C. (NCO content=0) and finally Solvesso 100 solvent (162 g) was added to produce a solution of polyester-urethane polymer at 55% solids.

The partially blocked polyisocyanate was prepared as follows. VESTANAT 1890 (742 g) (polyisocyanate trimer at 70% in butyl acetate and SOLVESSO 100 solvent, from Evonik) was heated at 70° C. in a glass reaction flask equipped with a stirrer, nitrogen inlet and reflux condenser. Caprolactam (81 g) was added over 5 minutes. The temperature was increased over 1 hour to 100° C. and maintained at 100° C. until the NCO content was about 7.2%. At 100° C., SOLVESSO 100 solvent (178 g) was added to obtain a solution having 60% NVC and a viscosity of 90-100 seconds (Afnor 4, 25° C.).

Example 3

Polyester-Urethane Including Norbornene Groups

Cyclohexane dimethanol (CHDM) (485 g of a 90% solution in water), methylpropanediol (241.5 g), terephthalic acid (123 g), isophthalic acid (244.5 g), nadic anhydride (453 g), dibutyl tin oxide (1.5 g) (FASTCAT 4201 catalyst from Atofina), and xylene (72 g) were added to a glass reaction flask equipped with a stirrer, nitrogen inlet and reflux condenser. The condenser was further equipped with a Dean-Stark flask to capture and quantify the water evolved during the reaction. The reactor was set for a temperature in the range of 225-235° C. After approximately 4 hours, the acid value of the resulting polyester polymer was approximately 58.0 mg KOH/g. The molecular weight of this prepolymer was about 1900 g/mol. To this prepolymer was added DBTDL (1.5 g) and IPDI (225 g). This reaction was allowed to proceed at 100° C. until all of the NCO was consumed (typically 4-5 hrs). The final molecular weight of the polyester-urethane polymer was 12,400 Daltons.

Example 4

Polyester-Urethane Including Norbornene Groups

CHDM (1449.7 g of a 90% solution in water), methylpropanediol (722.5 g), terephthalic acid (293.3 g), isophthalic acid (578 g), maleic anhydride (808.4 g), dibutyl tin oxide (4.2 g) (FASTCAT 4201 catalyst from Atofina), and xylene (187 g) were added to a glass reaction flask equipped with a stirrer, nitrogen inlet and reflux condenser. The condenser was further equipped with a Dean-Stark flask to capture and quantify the water evolved during the reaction. The reactor was set for 230° C. After approximately 5 hours, the acid value of the resulting polyester polymer was approximately 0.5 mg KOH/g resin. The temperature of the reactor was reduced to approximately 160° C., at which point dyclopentadiene (DCPD) (546.4 g) was added. The reactor was held an additional 6 hours at 160° C. to complete the Diels-Alder reaction between the maleic unsaturation and the DCPD. The resulting structure is believed to resemble that of a material prepared from nadic anhydride. The resulting modified polyester polymer composition was 84% solids and had an acid value of 1.4 mg KOH/g resin and an OH value of 56.6 mg KOH/g resin.

The modified polyester composition (1044.3 g) was added to a new reaction flask (same configuration as described above), along with IPDI (247.3 g) and dimethylol propionic acid (74.6 g). The temperature of the flask was maintained at about 100° C. and the reaction was continued for about 6 hours, at which point butanol (307 g), butyl cellosolve (307 g), and cyclohexanone (1587 g) were added to the flask. The resulting polyester-urethane polymer composition was 24% solids and had an acid value of 26.5 mg KOH/g resin.

The polyester-urethane polymer composition (100 g) was combined with a resole phenolic crosslinker resin (7.5 g). The resulting coating formulation had a ratio, on a solids weight basis, of 80% polyester-urethane polymer and 20% phenolic resin.

A sample of the coating formulation of Example 4 was applied onto both commercially available ETP and TFS using a wound wire rod. The coated steel samples were baked about 12 minutes in a 402° F. (204° C.) oven to dry and cure the coating. Once dried and cured, the film weight of the coating was determined to be from about 4.5 to 5.0 mg of coating per square inch of coated substrate (metric equivalent is 7 to 7.8 grams per square meter). It was noted that the appearance of the coating was smooth and glossy and had a goldish tint. Samples of the coated substrate were fabricated into food can ends, with the coating composition oriented as the internal coating. In addition, an analogous set of control food can ends were prepared from tin-plated and tin-free steel coated with a conventional epoxy-based coating system that is currently used commercially as a high corrosion-resistant coating for the interior of food can bodies and ends. Samples of both the control and experimental ends were then subjected to a variety of coating property tests to evaluate the suitability of the coatings for use as food-contact coatings for food or beverage cans. The cured coating composition of Example 4 on ETP substrate exhibited good coating properties (e.g., comparable adhesion, blush resistance, stain resistance, and corrosion resistance as that of the commercial control). The cured coating composition of Example 4 on TFS substrate also exhibited good coating properties, although not quite as good as on ETP substrate (e.g., the adhesion and corrosion resistance were not as good).

Example 5

Polyester-Urethane Including Norbornene Groups

TABLE 1

| Ingredient | Amount (weight parts) |
| --- | --- |
| Neopentylglycol | 742.8 |
| 1,4-cyclohexanedimethanol | 424 |
| Monoethylene glycol | 119 |
| Nadic Anhydride | 330 |
| Isophthalic acid | 1272 |
| RADIACID 960 | 517 |
| Dimer fatty acid | |
| Organometallic catalyst | 2 |
| Hydroquinone methyl ether | 2 |

The ingredients, in the amounts indicated above in Table 1, were charged to a vessel equipped with a stirrer, reflux condenser, packed column, thermocouple, and a heating mantle. The mixture was heated to a maximum of 215° C. in such a manner that the temperature of the distillate at the top of the partial condenser did not exceed 102° C. During the reaction, water was extracted by distillation until an acid number in the range of 15 to 25 was reached. The polyester was then diluted with xylene to achieve an NVC of 94% by weight. The mixture was subjected to azeotropic distillation until an acid number of about 7 and a cut viscosity (75% in Xylene) around 150 Poises at 25° C. was reached. After this step, the polyester was then diluted with SOLVESSO 100 solvent to reach an NVC of about 70% by weight. The viscosity was 63 Poises at 25° C., the acid number 7.3, and the NVC 69.4% (1 g, 60 minutes, 130° C.).

A partially blocked polyisocyanate compound was produced using the ingredients listed in Table 2 below. The "dried" solvents in Table 2 were mixed in advance with molecular sieves to avoid the presence of water. The partially blocked polyisocyanate compound was produced by first dissolving VESTANAT 1890/100 isocyanate tablets in dried xylene in a reactor at 100° C. After 1 hour of mixing, caprolactam was added in the reactor. Complete dissolution of the caprolactam was observed after a few minutes. The reactor was slowly heated to 100° C. Following the heating step, the % NCO (i.e., the weight of isocyanate groups divided by the weight of the mixture in the reactor) of the mixture was determined by titration and the reaction was stopped when the theoretical % NCO was reached (i.e., in this case, the theoretical point at which one-third of the NCO groups were calculated to be blocked and two-thirds were calculated to be unblocked), which took less than 2 hours. The resulting mixture was then diluted with a second charge of xylene to obtain a mixture having an NVC of 60% by weight.

TABLE 2

| Ingredient | Amount (wt-%) |
| --- | --- |
| IPDI-based polyisocyanate trimer* | 51.9 |
| Caprolactam | 8.1 |
| Dried xylene | 15 |
| Dried xylene charge 2 | 25 |

*VESTANATE 1890/100 product available from Evonik.

The polyester-urethane polymer of Example 5 was produced as follows using the ingredients in the amounts indicated in Table 3 below. The polyester of example 5 was charged in a reactor and heated up to 100° C. Then, the mixture including partially blocked polyisocyanate compound was added to the reactor over 10 minutes using an addition funnel, which was immediately flushed with SOLVESSO 100 solvent. The temperature was maintained around 100° C. and the reaction was continued until the mixture exhibited a stable viscosity and the NCO content was less than 0.01% (expressed in weight of NCO groups). Then butanol was added and the mixture was homogenized at 80° C. for 30 minutes. Finally, the additional SOLVESSO 100 solvent was added at 80° C. The viscosity was around 28 Poises at 25° C., no NCO was detectable by titration, and the NVC was 55.7% (1 g, 60 min, 130° C.).

TABLE 3

| Ingredient | Amount (wt-%) |
| --- | --- |
| Polyester of Example 5 | 63.7 |
| Partially blocked polyisocyanate | 17.3 |
| SOLVESSO 100 solvent[A] | 3.56 |
| Butanol | 7.06 |
| SOLVESSO 100 solvent[B] | 8.33 |

[A]First addition
[B]Second addition

The coating composition of Example 5 was prepared by mixing the ingredients included below in Table 4 using a stirrer. The viscosity of the resulting coating composition was adjusted with xylene to be in the range of 70 to 80 seconds as measured using a #4 Ford cup at 25° C. The NVC of the coating composition was determined to be 42.6% (1 g, 30 min, 200° C.).

TABLE 4

| Ingredient | Amount (weight parts) |
| --- | --- |
| Solvent mixture of dimethyl esters of C4 to C6 diacids | 6.81 |
| DOWANOL PMA solvent (Dow Chemical) | 6.81 |
| SOLVESSO 100 solvent (Imperial Oil) | 2.27 |
| Resole-type phenolic crosslinker | 15.68 |
| Resole-type phenolic crosslinker | 5.00 |
| Amino formaldehyde crosslinker | 0.73 |
| CYCAT 600 acid catalyst solution (20% in Butylglycol), from Cytec | 0.91 |
| LUBAPRINT 436 wax (L.P. Bader & Co.) | 3.18 |
| BYK 310 silicone solution (10% in Xylene, BYK-Chimie) | 0.41 |
| Polyester-Urethane Polymer of Example 5 | 58 |
| Xylene | 5 |

The Example 5 coating composition was applied on ETP substrate (2.8/2.8) and coated substrate samples were cured for 10 minutes in a 200° C. oven to obtain cured coatings that had a dry film weight of about 7.9 grams per square meter. The cured samples were subjected to various tests to assess the properties of the coating. The results of these tests are indicated below in Tables 5A and 5B.

TABLE 5A

| | |
| --- | --- |
| Number of MEK Double-rubs | 50 |
| Wedge Bend | 77% |
| Crazing | no evidence |
| End Fabrication (non-post lube) | OK |
| Porosity (average in milliamps for 6 can ends) | 8.2 mA |

TABLE 5B

| Retort Test Material | Blush | Microblistering | Adhesion | Porosity (mA) Before Retort | Porosity (mA) After Retort |
| --- | --- | --- | --- | --- | --- |
| Water | 9 | 10 | 10 | | |
| 3% Acetic Acid | 8 | 10 | 10 | | |
| Sulfuration Simulant | 8 | 10 | 10 | | |
| NaCl (1%) | 9 | 10 | 10 | 8.2 | 11.1 |

Each of the simulant solutions in Table 5B was prepared using deionized water.
A visual assessment was used to determine whether microblisters were present in the films. The results were ranked from 0 = very poor, to 10 = excellent (or defect-free). The X/Y format of the data corresponds, respectively, to flat/formed areas of the film.

Example 6

Polyester-Urethane Including Norbornene and Tricyclodecane Groups

The polyester-urethane polymer of Example 6 was prepared in a multi-step synthesis from the reactants in the indicated amounts in Table 6A below. The oligomer of Component A was synthesized using conventional reaction conditions and methods, with the dicyclopentadiene post-added and reacted with the unsaturation of Component A via a Diels-Alder reaction to incorporate unsaturated bicyclic groups (the DCPD was added over 30 minutes and the reaction mixture was held at 160° C. for 5 hours). The resulting Component A oligomer had an acid value of 0.4, a hydroxyl value of 109 and was 68.9% solids. The oligomer of Component B was separately synthesized using conventional reaction conditions and methods to yield a semi-solid material having 68.5% solids, an acid value of 1.2, and a hydroxyl value of 27. The final resin was formed by combining Components A and B and the DBTDL, heating the mixture to 90° C., and then adding the IPDI over 30 minutes, flushing with cyclohexanone, and holding the reaction mixture at about 90° C. for 3 hours. The resulting polyester-urethane polymer of Example 6 was cut with organic solvent to yield a resin composition that was 29.1% solids and had an acid value of 1.2 and a hydroxyl value of 14.5.

TABLE 6A

| Reactant | Percent by weight of polymer solids |
| --- | --- |
| Component A | |
| CHDM | 31.3 |
| Methyl propane diol | 17.7 |
| Terephthalic Acid (TPA) | 12.9 |
| Isophthalic Acid (IPA) | 25.8 |
| Tin Oxalate | 0.1 |
| Maleic Anhydride | 7.1 |
| Dicyclopentadiene (DCPD) | 5.1 |
| | 100.0 |
| Component B | |
| TCDM | 44.2 |
| 1,4-Butane Diol | 8.2 |
| Terephthalic Acid (TPA) | 47.5 |
| Organometallic catalyst | 0.1 |
| | 100.0 |

TABLE 6A-continued

| Reactant | Percent by weight of polymer solids |
|---|---|
| Final Resin of Example 6 | |
| Component A | 50.2 |
| Component B | 38.8 |
| IPDI | 10.9 |
| Dibutyl tin diluarate (DBTDL) | 0.1 |
| | 100.0 |

The coating composition of Example 6 was prepared by mixing the ingredients listed below in Table 6B using a stirrer. The viscosity of the resulting coating composition was adjusted with xylene to be in the range of 70 to 80 seconds as measured using a #4 Ford cup at 25° C. The coating composition was determined to have a solids content of 38.0% (0.5 grams, 11 min, 204° C.).

TABLE 6B

| Ingredient | Amount (wt-%) |
|---|---|
| Polyester-Urethane of Example 6 | 73.5 |
| Resole-type phenolic crosslinker | 15.3 |
| Dibasic Ester (DBE) solvent | 7.8 |
| Xylene solvent | 3.4 |
| | 100.0 |

The Example 6 coating composition was applied on ETP substrate (2.8/2.8) and coated substrate samples were cured for 10 minutes at a peak metal temperature (PMT) of 204° C. to obtain cured coatings that had a dry film weight of about 7.8 grams per square meter. The cured samples were subjected to various tests to assess the properties of the coating. The results of these tests are indicated below in Table 6C. The coating properties of the cured epoxy-free coating of Example 6 were comparable to a commercial BPA-based epoxy control.

TABLE 6C

| | |
|---|---|
| Dry Adhesion | No Failure |
| MEK Double Rubs | 35 |
| Impact Craze (26 in lbs/2 lb wt) | None |
| 52 mm Can End Fabrication | OK |
| Deionoized Water Retort (90' @ 121° C.) | |
| Blush (Liquid/Vapor) | None/None |
| Adhesion (Liquid/Vapor) | No Failure/No Failure |
| 2% NaCl Retort (90' @ 121° C.) | |
| Blush (Liquid/Vapor) | None/None |
| Adhesion (Liquid/Vapor) | No Failure/No Failure |
| Blistering (Liquid/Vapor) | None/None |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The structural representations depicted herein are non-limiting with respect to stereochemistry and are intended to encompass all suitable stereoisomers.

What is claimed is:

1. An article, comprising:
    a metal substrate of a food or beverage container, or a portion thereof; and
    a coating applied on at least a portion of a major surface of the substrate, the coating prepared from a coating composition including a polyester polymer having a plurality of polycyclic groups, wherein the polymer includes both one or more unsaturated bicyclic groups and one or more at least tricyclic groups.

2. The article of claim 1, wherein a backbone of the polyester polymer includes both ester and urethane linkages.

3. The article of claim 1, wherein the one or more unsaturated bicyclic groups are bridged bicyclic groups and wherein a carbon-carbon double bond is present between atoms of a ring of the unsaturated bicyclic group.

4. The article of claim 1, wherein the one or more unsaturated bicyclic groups comprise bicyclo[2.1.1]hexene, bicyclo[2.2.1]heptene, bicyclo[2.2.1]heptadiene, bicyclo[2.2.2]octene, bicyclo[2.2.2]octadiene, or a combination thereof.

5. The article of claim 1, wherein the one or more unsaturated bicyclic groups are provided by nadic acid, nadic anhydride, or a mixture thereof.

6. The article of claim 1, wherein the polycyclic groups are present in a backbone of the polymer.

7. The article of claim 1, wherein the polymer includes at least 10 weight percent of the polycyclic groups, based on the weight percent of polycyclic-group-containing monomer relative to the total weight of the polymer.

8. The article of claim 1, wherein the polymer has a glass transition temperature of at least 50° C.

9. The article of claim 1, wherein the polymer has a glass transition temperature of 80° C. to 125° C.

10. The article of claim 1, wherein the polymer has an iodine value of at least 10.

11. The article of claim 1, wherein the one or more at least tricyclic groups are saturated groups.

12. The article of claim 1, wherein the polymer includes:
    from 5 to 50 percent by weight of the one or more at least tricyclic groups,
    from 1 to 35 percent by weight of the one or more unsaturated bicyclic groups,
    wherein the aforementioned weight percents are based on the amount of at least tricyclic group containing monomer and unsaturated bicyclic group containing monomer incorporated into the polymer relative to the total weight of the polymer.

13. The article of claim 1, wherein the polymer is derived from ingredients including, based on total weight solids, from 17 to 33 percent by weight of tricyclodecane dimethanol and from 5 to 17 percent by weight of nadic anhydride.

14. The article of claim 1, wherein the coating composition, based on total weight solids, includes at least 50 weight percent of the polymer.

15. The article of claim 1, wherein the polymer further comprises one or more polycyclic groups derived from isosorbide, isomannide, isoiodide, or a derivative or combination thereof.

16. The article of claim 1, wherein the one or more at least tricyclic groups comprise a substituted or unsubstituted tricyclodecane group.

17. The article of claim 16, wherein the tricyclodecane group is provided by tricyclodecane dimethanol, tricyclodecane diamine, tricyclodecane diisocyanate, or a derivative or mixture thereof.

18. A method, comprising:
providing a coating composition comprising:
- a polyester polymer having a plurality of polycyclic groups, wherein the polymer includes one or more unsaturated bicyclic groups and one or more at least tricyclic groups, and
- a liquid carrier; and applying the coating composition on a metal substrate prior to, or after, forming the metal substrate into a food or beverage can or a portion thereof.

19. A coating composition, comprising:
at least 10 weight percent, based on total solids, of a polyester polymer having:
- a glass transition temperature of at least 50° C., and
- polycyclic groups that constitute at least 10 weight percent of the polymer, based on the weight percent of polycyclic-group-containing monomer relative to the total weight of the polymer, wherein the polymer includes both one or more unsaturated bicyclic groups and one or more at least tricyclic groups;

a resole phenolic type crosslinker; and
a liquid carrier.

20. The coating composition of claim 19, wherein a backbone of the polyester polymer includes urethane linkages.

* * * * *